United States Patent
McKinnis

(10) Patent No.: US 11,584,304 B2
(45) Date of Patent: Feb. 21, 2023

(54) WHEEL WELL DRAWER

(71) Applicant: Rosenbauer America, LLC, Wyoming, MN (US)

(72) Inventor: Dwight Sherwood McKinnis, Lino Lakes, MN (US)

(73) Assignee: Rosenbauer America, LLC, Wyoming, MN (US)

( * ) Notice: Subject to any disclaimer, the term of this patent is extended or adjusted under 35 U.S.C. 154(b) by 389 days.

(21) Appl. No.: 16/841,039

(22) Filed: Apr. 6, 2020

(65) Prior Publication Data

US 2021/0309158 A1  Oct. 7, 2021

(51) Int. Cl.
*B60R 9/00* (2006.01)
*B60P 1/64* (2006.01)
*B60R 11/00* (2006.01)
*A47B 88/40* (2017.01)

(52) U.S. Cl.
CPC .............. *B60R 9/00* (2013.01); *B60P 1/6436* (2013.01); *A47B 88/40* (2017.01); *B60R 2011/004* (2013.01)

(58) Field of Classification Search
CPC .......... B60R 11/06; B60R 9/00; B60R 9/065; B60R 2011/0019; B60R 2011/0036; B60R 2011/004; B60R 2011/0084; B60R 5/00; B60R 7/02; B62D 33/0207; B62D 33/023; A47B 88/40
USPC ............................................... 224/403–404
See application file for complete search history.

(56) References Cited

U.S. PATENT DOCUMENTS

| | | | |
|---|---|---|---|
| 4,384,663 A | 5/1983 | Smith-Williams | |
| 4,802,069 A | 1/1989 | Chandler | |
| 5,535,931 A * | 7/1996 | Barlow | B60R 7/02 224/543 |
| 5,567,000 A | 10/1996 | Clare | |
| 5,706,991 A | 1/1998 | Stewart | |
| 5,823,598 A * | 10/1998 | Clare | B60J 10/60 92/144 |
| 5,904,412 A * | 5/1999 | Lammens | A47B 88/43 312/334.7 |
| 5,988,778 A * | 11/1999 | Lammens | E05B 65/464 312/219 |
| 6,237,211 B1 * | 5/2001 | Clare | B60R 11/06 29/469 |
| 6,439,634 B1 | 8/2002 | Jensen et al. | |
| 7,431,368 B2 | 10/2008 | Henderson et al. | |
| 7,562,925 B2 | 7/2009 | Henderson et al. | |
| 7,686,365 B2 | 3/2010 | Thelen et al. | |
| 7,931,324 B2 | 4/2011 | Henderson et al. | |
| 8,573,671 B2 | 11/2013 | Watkins | |
| 9,193,290 B2 * | 11/2015 | Lazarevich | B60P 3/14 |
| 10,173,603 B2 * | 1/2019 | Dunham | B60R 9/065 |
| 10,513,228 B2 | 12/2019 | Steele et al. | |
| 2001/0013709 A1 | 8/2001 | Clare et al. | |
| 2001/0038219 A1 | 11/2001 | Clare et al. | |

(Continued)

*Primary Examiner* — Adam J Waggenspack
(74) *Attorney, Agent, or Firm* — Ballard Spahr LLP

(57) ABSTRACT

A drawer for storage is positioned within a wheel well of a vehicle. A bottom panel of the drawer has an arcuate or faceted shape to accommodate the wheel over which the drawer sits. The drawer is movable between a closed and an open position on slides received within guide rails mounted either directly on the vehicle or on panels of a cabinet which encloses the drawer, the cabinet being mounted on the vehicle.

22 Claims, 4 Drawing Sheets

(56) References Cited

U.S. PATENT DOCUMENTS

2008/0231066 A1  9/2008  Harrell
2010/0326936 A1* 12/2010  Hanley .................. A47B 81/00
                                                   211/126.15
2019/0314654 A1  10/2019  Lackore, Jr.

* cited by examiner

WHEEL WELL DRAWER

FIELD OF THE INVENTION

This invention relates to storage compartments for vehicles.

BACKGROUND

There is never enough storage space on emergency vehicles such as fire engines, ambulances and the like. Designers of emergency vehicles go to great lengths to provide convenient storage compartments for gear, tools and supplies. However, there are areas of vehicles which, due to the shape of their internal volume and/or their location on the vehicle, have traditionally been underutilized or neglected altogether for storage purposes. There is clearly an opportunity to use hither to ignored internal spaces of a vehicle for storage.

SUMMARY

The invention concerns a drawer mountable on a vehicle and positionable over a wheel thereof. In an example embodiment the drawer comprises a bottom panel extending partially about an axis. A first end panel is attached to a first end of the bottom panel. The first end panel defines a first plane oriented parallel to the axis. A second end panel is attached to a second end of the bottom panel opposite to the first end. The second end panel defines a second plane oriented parallel to the axis. A rear panel is attached to the bottom panel and the first and second end panels. The rear panel defines a third plane oriented perpendicular to the axis. A front panel is attached to the bottom panel and the first and second end panels in spaced relation to the rear panel. The front panel defines a fourth plane oriented perpendicular to the axis.

By way of example, the bottom panel may have an arcuate shape, or may comprise a plurality of facets extending from the first end to the second end thereof. In a specific example, each of the facets comprises a flat panel. The rear panel has a perimeter. A portion of the perimeter is attached to the bottom panel. The portion of the perimeter matches the shape of the bottom panel. In an example embodiment, the front panel is larger than the rear panel.

An example embodiment further comprises a first slide attached to the first end panel and a second slide attached to the second end panel. The first and second slides are oriented parallel to the axis. A first bulkhead is arranged in facing relation to the first end panel. A first guide rail is mounted on the first bulkhead. The first guide rail is oriented parallel to the axis and receives the first slide. The first slide is movable relatively to the first guide rail. A second bulkhead is arranged in facing relation to the second end panel. A second guide rail is mounted on the second bulkhead. The second guide rail is oriented parallel to the axis and receives the second slide. The second slide is movable relatively to the second guide rail. Further by way of example, a first slide extension is received within the first guide rail and the first slide is received within the first slide extension. A second slide extension is received within the second guide rail and the second slide is received within the second slide extension. The first slide extension is movable relatively to the first guide rail and the first slide is movable relatively to the first slide extension. The second slide extension is movable relatively to the second guide rail and the second slide is movable relatively to the second slide extension.

In an example embodiment, a cover bulkhead may be attached to the first and the second bulkheads. The cover bulkhead overlies the bottom panel when the first and second bulkheads are in facing relation with the first and second end panels. A rear bulkhead may also be attached to the first and second bulkheads in facing relation with the rear panel. Further by way of example, a bottom bulkhead has a first end attached to the first bulkhead and a second end attached to the second bulkhead. The bottom bulkhead extends partially about the axis and is positioned between the axis and the bottom panel when the first and second bulkheads are in facing relation with the first and second end panels. In an example embodiment the bottom bulkhead may have an arcuate shape or the bottom bulkhead may comprise a plurality of facets extending from the first end to the second end thereof. By way of example each of the facets may comprise a flat panel. Additionally by way of example, the rear bulkhead has a perimeter. A portion of the perimeter is attached to the bottom bulkhead. The portion of the perimeter matches a shape of the bottom bulkhead.

The invention further encompasses a vehicle. In an example embodiment the vehicle comprises a chassis. A body is mounted on the chassis. A plurality of wheels are mounted on the chassis. A drawer is mounted on the vehicle and positioned over one of the wheels. In an example embodiment the drawer comprises a bottom panel extending partially about an axis oriented parallel to an axis of rotation of the one wheel. A first end panel is attached to a first end of the bottom panel. The first end panel defines a first plane oriented parallel to the axis. A second end panel is attached to a second end of the bottom panel opposite to the first end. The second end panel defines a second plane oriented parallel to the axis. A rear panel is attached to the bottom panel and the first and second end panels. The rear panel defines a third plane oriented perpendicular to the axis. A front panel is attached to the bottom panel and the first and second end panels in spaced relation to the rear panel. The front panel defines a fourth plane oriented perpendicular to the axis.

An example embodiment further comprises a first slide attached to the first end panel. A second slide is attached to the second end panel. The first and second slides are oriented parallel to the axis. A first guide rail is mounted on the chassis or the body. The first guide rail is oriented parallel to the axis and receives the first slide. The first slide is movable relatively to the first guide rail. A second guide rail is mounted on the chassis or the body in spaced relation to the first guide rail. The second guide rail is oriented parallel to the axis and receives the second slide. The second slide is movable relatively to the second guide rail. In an example embodiment a first slide extension is received within the first guide rail. The first slide is received within the first slide extension. A second slide extension is received within the second guide rail. The second slide is received within the second slide extension. The first slide extension is movable relatively to the first guide rail and the first slide is movable relatively to the first slide extension. Furthermore, the second slide extension is movable relatively to the second guide rail and the second slide is movable relatively to the second slide extension.

In an example embodiment the bottom panel may have an arcuate shape or the bottom panel may comprise a plurality of facets extending from the first end to the second end thereof. By way of example, each of the facets may comprise a flat panel. Further by way of example, the rear panel has a perimeter. A portion of the perimeter is attached to the bottom panel. The portion of the perimeter matches a shape of the bottom panel. The front panel also has a perimeter. A portion of the perimeter of the front panel is attached to the bottom panel. The portion of the perimeter of the front panel may also match the shape of the bottom panel. In an example embodiment the front panel is larger than the rear panel.

An example embodiment may further comprise a first bulkhead arranged in facing relation to the first end panel. A first guide rail is mounted on the first bulkhead. The first guide rail is oriented parallel to the axis and receives the first slide. The first slide is movable relatively to the first guide rail. A second bulkhead is arranged in facing relation to the second end panel. A second guide rail is mounted on the second bulkhead. The second guide rail is oriented parallel to the axis and receives the second slide. The second slide is movable relatively to the second guide rail.

An example embodiment may further comprise a first slide extension received within the first guide rail. The first slide is received within the first slide extension. A second slide extension is received within the second guide rail. The second slide is received within the second slide extension. The first slide extension is movable relatively to the first guide rail and the first slide is movable relatively to the first slide extension. The second slide extension is movable relatively to the second guide rail and the second slide is movable relatively to the second slide extension.

An example embodiment may further comprise a cover bulkhead attached to the first and the second bulkheads. The cover bulkhead overlies the bottom panel when the first and second bulkheads are in facing relation with the first and second end panels. A rear bulkhead is attached to the first and second bulkheads in facing relation with the rear panel. A bottom bulkhead has a first end attached to the first bulkhead and a second end attached to the second bulkhead. The bottom bulkhead extends partially about the axis and is positioned between the axis and the bottom panel when the first and second bulkheads are in facing relation with the first and second end panels. The bottom bulkhead may have an arcuate shape or may comprise a plurality of facets extending from the first end to the second end thereof. In an example embodiment, each of the facets may comprise a flat panel. In an example embodiment the rear bulkhead has a perimeter. A portion of the perimeter is attached to the bottom bulkhead. The portion of the perimeter matches a shape of the bottom bulkhead.

DETAILED DESCRIPTION

Figure 1:
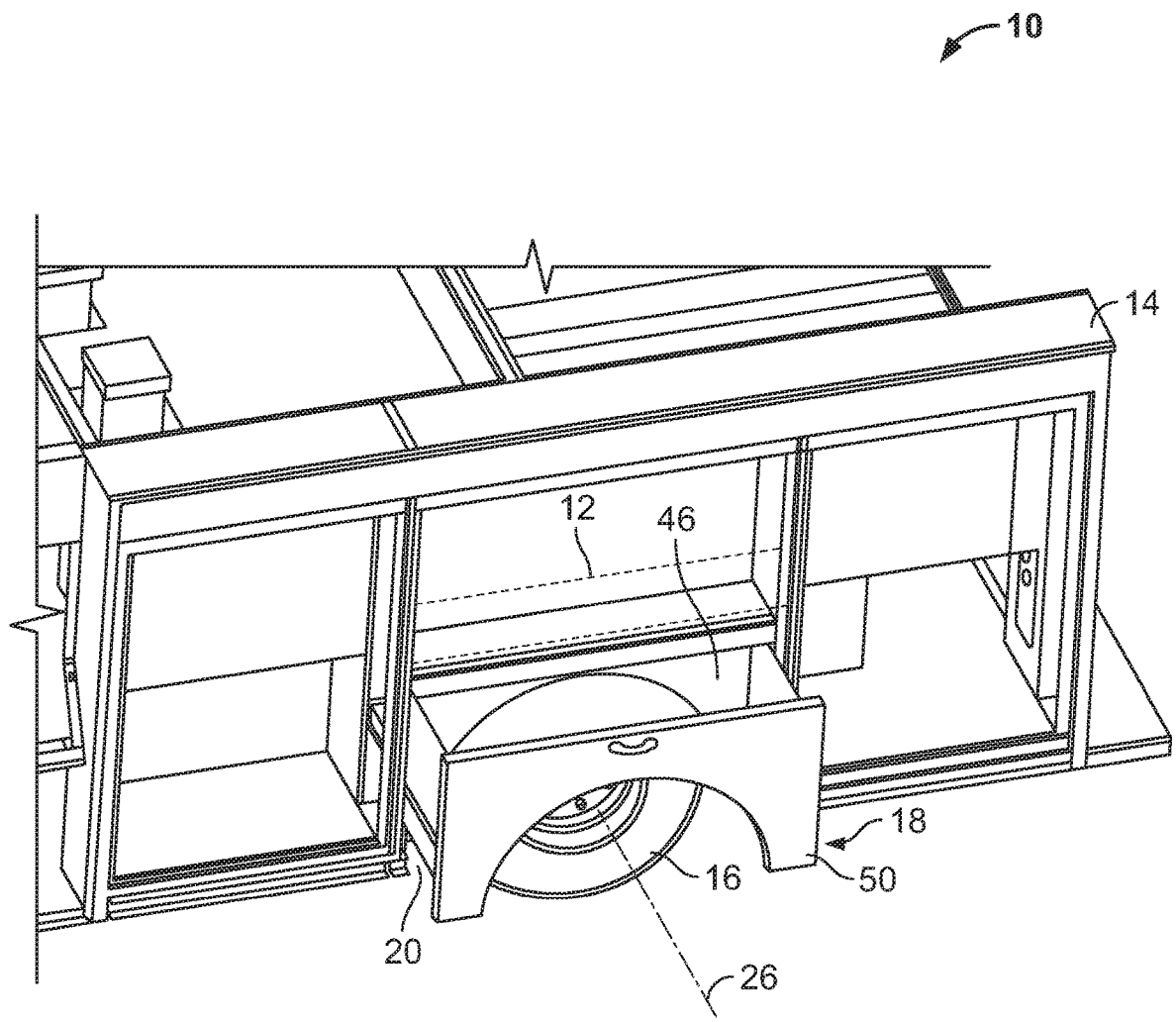
FIG. 1 is an isometric view of a vehicle having an example drawer according to the invention.

One aspect of the invention is directed toward a vehicle 10, for example, an emergency vehicle such as the fire engine shown in FIG. 1. In this example embodiment the vehicle 10 comprises a chassis 12 and a body 14 mounted on the chassis. A plurality of wheels 16 are mounted on the chassis 12 and a drawer 18 is mounted on the vehicle and positioned over one of the wheels. Drawer 18 is movable between an open position (shown) and a closed position and allows the space in the wheel well 20 to be used for storage.

Figure 2:
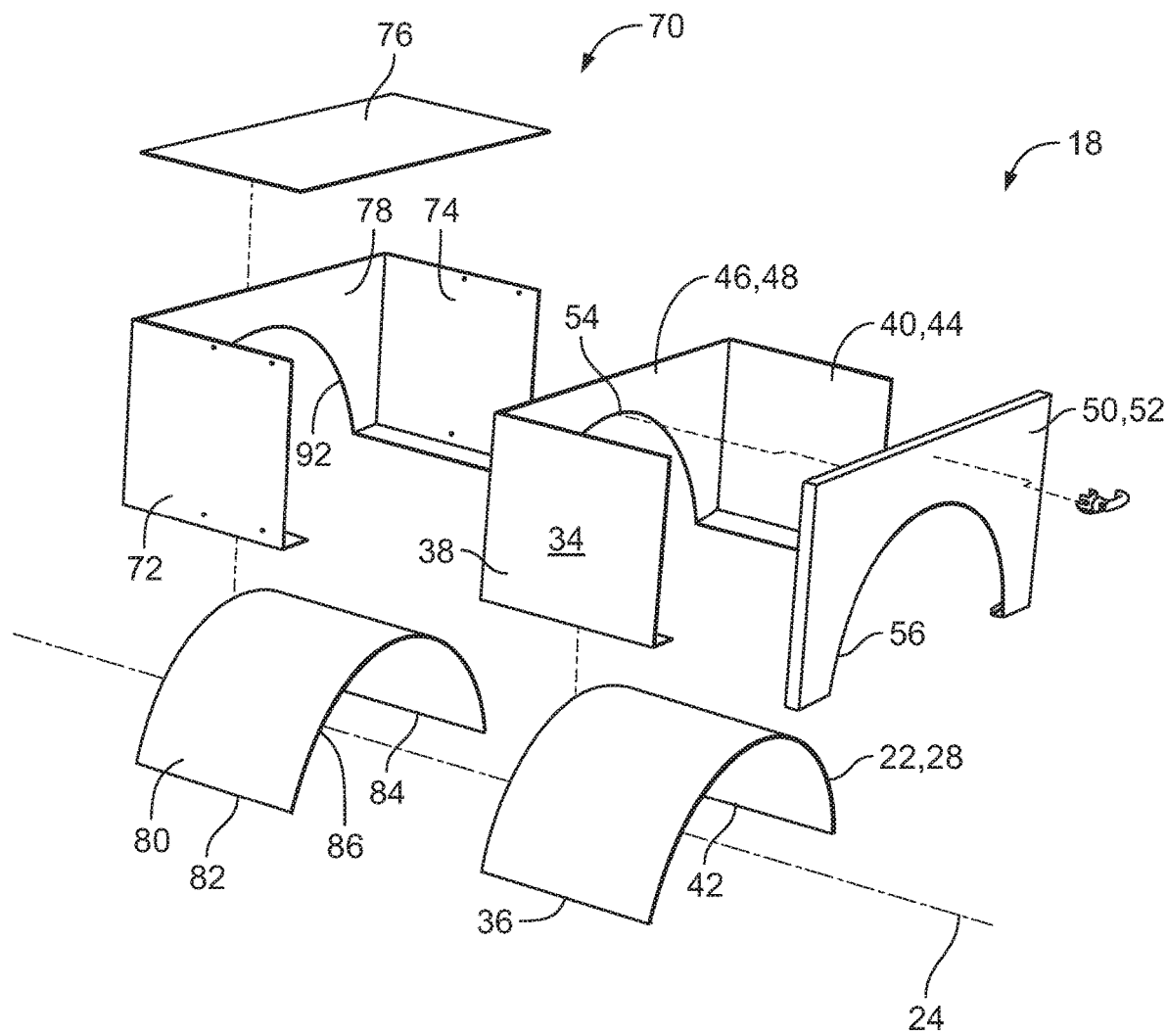
FIG. 2 is an exploded isometric view of an example drawer according to the invention.
Figure 3:
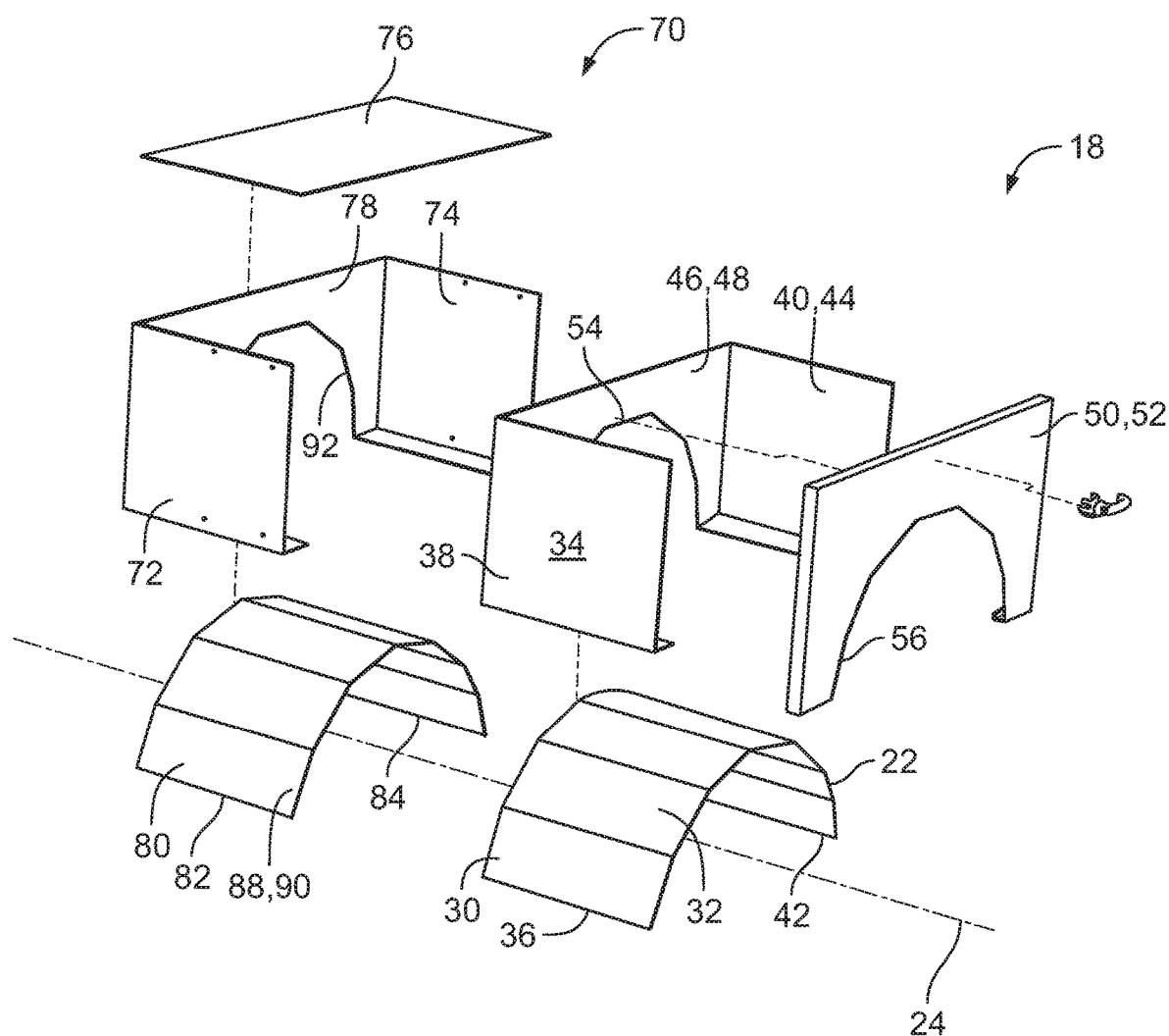
FIG. 3 is an exploded isometric view of another embodiment of an example drawer according to the invention.

In an example embodiment shown in FIG. 2, the drawer 18 comprises a bottom panel 22 extending partially about an axis 24 oriented substantially parallel to an axis of rotation 26 of the wheel 16 (see also FIG. 1). Bottom panel 22 may have an arcuate shape 28 as shown in FIG. 2. In another embodiment, shown in FIG. 3, the bottom panel 22 comprises a plurality of facets 30 wherein each of the facets comprises a flat panel 32.

As further shown in FIG. 2, a first end panel 34 is attached to a first end 36 of the bottom panel 22. The first end panel 34 defines a first plane 38 oriented parallel to the axis 24. A second end panel 40 is attached to a second end 42 of the bottom panel 22 opposite to the first end 36. The second end panel 40 defines a second plane 44 oriented parallel to the axis 24. A rear panel 46 is attached to the bottom panel 22 and the first and second end panels 34 and 40. The rear panel 46 defines a third plane 48 oriented perpendicular to the axis 24. A front panel 50 is attached to the bottom panel 22 and the first and second end panels 34 and 40 in spaced relation to the rear panel 46. The front panel 50 defines a fourth plane 52 oriented perpendicular to the axis 24. The rear and front panels 46 and 50 have respective perimeters, and respective portions 54 and 56 of each perimeter are attached to the bottom panel 22. The perimeter portions 54 and 56 match the shape of the bottom panel 22. As shown in FIG. 1 the front panel 50 is larger than the rear panel 46 and serves to enclose the wheel well 20.

Figure 4:
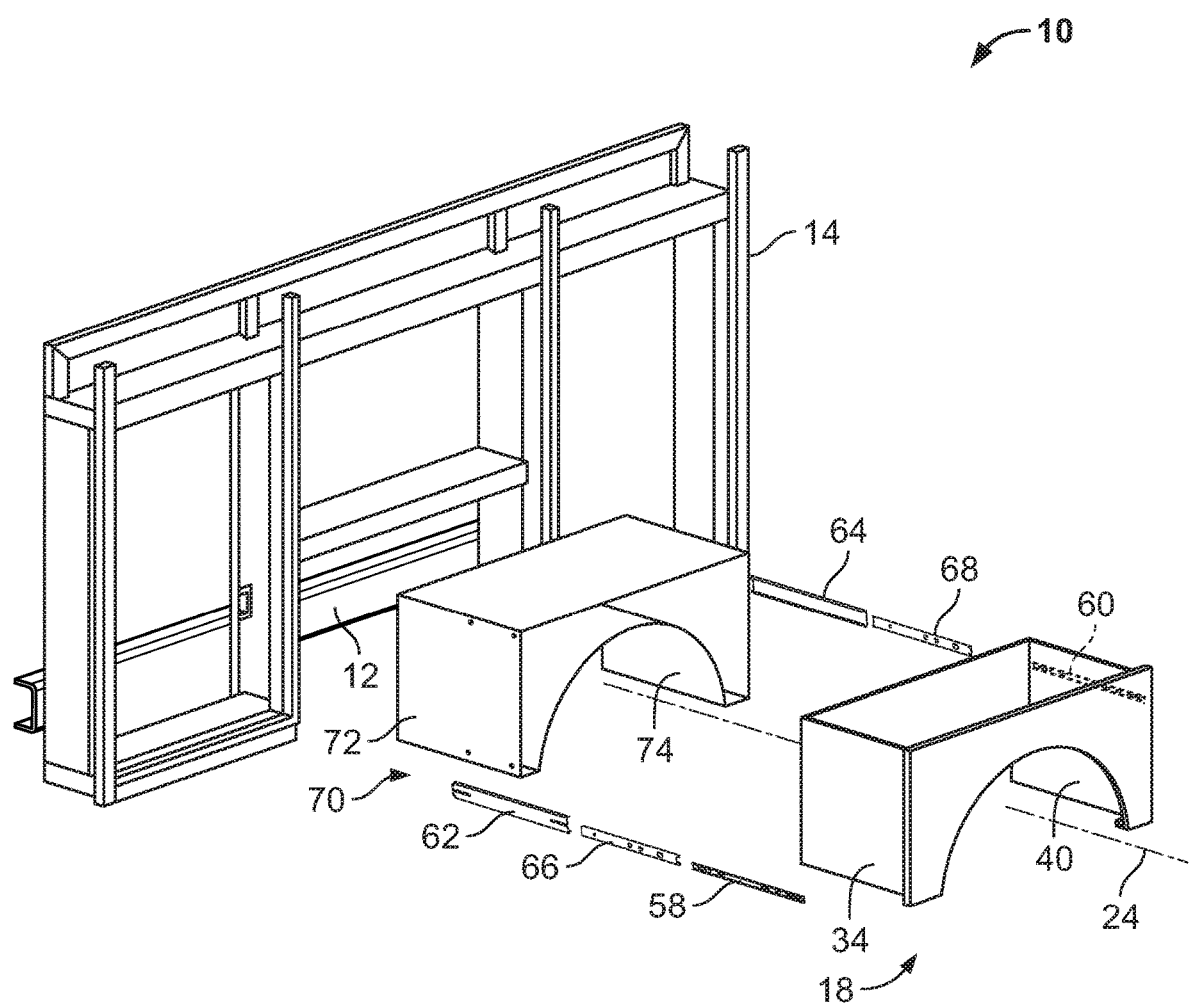
FIG. 4 is an exploded isometric view of an example drawer according to the invention.

FIG. 4 shows how the drawer 18 is movably mounted on the vehicle 10 using first and second slides 58 and 60, first and second guide rails 62 and 64, and, when desired, first and second slide extensions 66 and 68. The first and second slides 58 and 60 are respectively attached to the first and second end panels 34 and 40. Slides 58 and 60 are oriented substantially parallel to the axis 24. The first and second slides 58 and 60 are respectively received within the first and second guide rails 62 and 64, either directly or via respective intermediate slide extensions 66 and 68. Guide rails and slide extensions are also oriented substantially parallel to the axis 24. In operation, the guide rails 62 and 64 are fixed to a structure and the slides 58 and 60 and the slide extensions 66 and 68 move relatively to the guide rails and one another to permit motion of the drawer 18 relative to the structure in a direction parallel to axis 24.

Guide rails 62 and 64 may be mounted directly on the vehicle 10, for example, on the chassis 12 or the body 14, but it is advantageous to attach the guide rails to a cabinet 70 which is attached to the vehicle. As shown in FIGS. 2 and 4, cabinet 70 comprises a first bulkhead 72 arranged in facing relation to the first end panel 34. First guide rail 62 is mounted on the first bulkhead (see FIG. 4). A second bulkhead 74 is arranged in facing relation to the second end panel 40, and the second guide rail 64 is mounted on the second bulkhead. A cover bulkhead 76 is attached to the first and second bulkheads 72 and 74, the cover bulkhead overlying the bottom panel 22 when the first and second bulkheads are in facing relation with the first and second end panels 34 and 40. A rear bulkhead 78 attached to the first and second bulkheads 72 and 74 in facing relation with the rear panel 46. A bottom bulkhead 80 has a first end 82 attached to the first bulkhead 72 and a second end 84 attached to the second bulkhead 74. The bottom bulkhead extends partially about the axis 24 and is positioned between the axis 24 and the bottom panel 22 when the first and second bulkheads 72 and 74 are in facing relation with the first and second end panels 34 and 40.

As shown in FIG. 2, the bottom bulkhead 80 has an arcuate shape 86. In another embodiment, shown in FIG. 3, the bottom bulkhead 80 comprises a plurality of facets 88 extending from its first end 82 to its second end 84. In this example each of the facets 88 comprises a flat panel 90. Similar to rear panel 46, the rear bulkhead 78 has a perimeter, a portion 92 of the perimeter being attached to the bottom bulkhead 80. The portion 92 of the perimeter matches the shape of the bottom bulkhead.

It is expected that drawers according to the invention will efficiently increase the storage capacity of vehicles on which they are mounted, making hitherto unusable space available for carrying equipment and supplies.

What is claimed is:

1. A drawer mountable on a vehicle and positionable over a wheel thereof, said drawer comprising:
    a bottom panel comprising an arcuate shape extending less than 360 degrees about an axis oriented parallel to an axis of rotation of said wheel;
    a first end panel attached to a first end of said bottom panel, said first end panel defining a first plane oriented parallel to said axis;
    a second end panel attached to a second end of said bottom panel opposite to said first end, said second end panel defining a second plane oriented parallel to said axis;
    a rear panel comprising a perimeter, a first portion of said perimeter attached to said bottom panel and a second portion of said perimeter attached to said first and second end panels, said first portion of said perimeter comprising an arcuate shape, said rear panel defining a third plane oriented perpendicular to said axis; and
    a front panel comprising a perimeter, a first portion of said perimeter attached to said bottom panel and a second portion of said perimeter attached to said first and second end panels in spaced relation to said rear panel, said first portion of said perimeter comprising an arcuate shape, said front panel defining a fourth plane oriented perpendicular to said axis.

2. The drawer according to claim 1, wherein said front panel is larger than said rear panel.

3. The drawer according to claim 1, further comprising a first slide attached to said first end panel and a second slide attached to said second end panel, said first and second slides being oriented parallel to said axis.

4. The drawer according to claim 3, further comprising:
    a first bulkhead arranged in facing relation to said first end panel;
    a first guide rail mounted on said first bulkhead, said first guide rail being oriented parallel to said axis and receiving said first slide, said first slide being movable relatively to said first guide rail;
    a second bulkhead arranged in facing relation to said second end panel;
    a second guide rail mounted on said second bulkhead, said second guide rail being oriented parallel to said axis and receiving said second slide, said second slide being movable relatively to said second guide rail.

5. The drawer according to claim 4, further comprising:
    a first slide extension received within said first guide rail, said first slide being received within said first slide extension;
    a second slide extension received within said second guide rail, said second slide being received within said second slide extension; wherein
    said first slide extension is movable relatively to said first guide rail, said first slide is movable relatively to said first slide extension; and
    said second slide extension is movable relatively to said second guide rail, and said second slide is movable relatively to said second slide extension.

6. The drawer according to claim 4, further comprising a cover bulkhead attached to said first and said second bulkheads, said cover bulkhead overlying said bottom panel when said first and second bulkheads are in facing relation with said first and second end panels.

7. The drawer according to claim 4, further comprising a rear bulkhead attached to said first and second bulkheads in facing relation with said rear panel.

8. The drawer according to claim 4, further comprising a bottom bulkhead having a first end attached to said first bulkhead and a second end attached to said second bulkhead, said bottom bulkhead extending less than 360 degrees about said axis and positioned between said axis and said bottom panel when said first and second bulkheads are in facing relation with said first and second end panels.

9. The drawer according to claim 8, wherein said bottom bulkhead comprises an arcuate shape.

10. The drawer according to claim 7, wherein said rear bulkhead has a perimeter, a portion of said perimeter being attached to said bottom bulkhead, said portion of said perimeter matching a shape of said bottom bulkhead.

11. A vehicle, said vehicle comprising:
    a chassis;
    a body mounted on said chassis;
    a plurality of wheels mounted on said chassis;
    a drawer mounted on said vehicle and positioned over one of said wheels, said drawer comprising:
    a bottom panel comprising an arcuate shape extending less than 360 degrees about an axis oriented parallel to an axis of rotation of said one wheel;
    a first end panel attached to a first end of said bottom panel, said first end panel defining a first plane oriented parallel to said axis;
    a second end panel attached to a second end of said bottom panel opposite to said first end, said second end panel defining a second plane oriented parallel to said axis;
    a rear panel comprising a perimeter, a first portion of said perimeter attached to said bottom panel and a second portion of said perimeter attached to said first and second end panels, said first portion of said perimeter comprising an arcuate shape, said rear panel defining a third plane oriented perpendicular to said axis; and
    a front panel comprising a perimeter, a first portion of said perimeter attached to said bottom panel and a second portion of said perimeter attached to said first and second end panels in spaced relation to said rear panel, said first portion of said perimeter comprising an arcuate shape, said front panel defining a fourth plane oriented perpendicular to said axis.

12. The vehicle according to claim 11, further comprising:
    a first slide attached to said first end panel;
    a second slide attached to said second end panel, said first and second slides being oriented parallel to said axis;
    a first guide rail mounted on said chassis or said body, said first guide rail being oriented parallel to said axis and receiving said first slide, said first slide being movable relatively to said first guide rail;
    a second guide rail mounted on said chassis or said body in spaced relation to said first guide rail, said second guide rail being oriented parallel to said axis and receiving said second slide, said second slide being movable relatively to said second guide rail.

13. The vehicle according to claim 12, further comprising:
a first slide extension received within said first guide rail, said first slide being received within said first slide extension;
a second slide extension received within said second guide rail, said second slide being received within said second slide extension; wherein
said first slide extension is movable relatively to said first guide rail, said first slide is movable relatively to said first slide extension; and
said second slide extension is movable relatively to said second guide rail, and said second slide is movable relatively to said second slide extension.

14. The vehicle according to claim 11, wherein said front panel is larger than said rear panel.

15. The vehicle according to claim 11, further comprising a first slide attached to said first end panel and a second slide attached to said second end panel, said first and second slides being oriented parallel to said axis.

16. The vehicle according to claim 15, further comprising:
a first bulkhead arranged in facing relation to said first end panel;
a first guide rail mounted on said first bulkhead, said first guide rail being oriented parallel to said axis and receiving said first slide, said first slide being movable relatively to said first guide rail;
a second bulkhead arranged in facing relation to said second end panel;
a second guide rail mounted on said second bulkhead, said second guide rail being oriented parallel to said axis and receiving said second slide, said second slide being movable relatively to said second guide rail.

17. The vehicle according to claim 16, further comprising:
a first slide extension received within said first guide rail, said first slide being received within said first slide extension;
a second slide extension received within said second guide rail, said second slide being received within said second slide extension; wherein
said first slide extension is movable relatively to said first guide rail, said first slide is movable relatively to said first slide extension; and
said second slide extension is movable relatively to said second guide rail, and said second slide is movable relatively to said second slide extension.

18. The vehicle according to claim 16, further comprising a cover bulkhead attached to said first and said second bulkheads, said cover bulkhead overlying said bottom panel when said first and second bulkheads are in facing relation with said first and second end panels.

19. The vehicle according to claim 16, further comprising a rear bulkhead attached to said first and second bulkheads in facing relation with said rear panel.

20. The vehicle according to claim 16, further comprising a bottom bulkhead having a first end attached to said first bulkhead and a second end attached to said second bulkhead, said bottom bulkhead extending less than 360 degrees about said axis and positioned between said axis and said bottom panel when said first and second bulkheads are in facing relation with said first and second end panels.

21. The vehicle according to claim 20, wherein said bottom bulkhead comprises an arcuate shape.

22. The vehicle according to claim 19, wherein said rear bulkhead has a perimeter, a portion of said perimeter being attached to said bottom bulkhead, said portion of said perimeter matching a shape of said bottom bulkhead.

* * * * *